United States Patent [19]

Flaherty

[11] Patent Number: 5,638,729
[45] Date of Patent: Jun. 17, 1997

[54] BORING BAR HOLDER WITH U-SHAPED CLAMPING MEMBER

[76] Inventor: Robert M. Flaherty, 1842 Randolph St., Florence, Ala. 35630

[21] Appl. No.: 509,431

[22] Filed: Jul. 31, 1995

[51] Int. Cl.$^6$ .................................................. B23B 29/02
[52] U.S. Cl. .................................................. 82/158; 279/84
[58] Field of Search .................. 82/157–161; 279/83–89

[56] References Cited

U.S. PATENT DOCUMENTS

| 1,308,282 | 7/1919 | Gibbs | 82/158 |
| 1,332,731 | 3/1920 | Krieger | 82/158 |
| 2,171,802 | 11/1939 | Nielsen | 82/158 |

Primary Examiner—M. Rachuba
Assistant Examiner—Kenneth S. Hansen
Attorney, Agent, or Firm—C. A. Phillips; Joseph H. Beumer

[57] ABSTRACT

A boring bar holder for use with a lathe has a massive metal block with a generally triangular cavity extending transversely across the block. Inside the cavity a pair of diagonally extending surfaces are defined by the inside of upper and lower walls which intersect one another along a centering line. A U-shaped clamp rides in longitudinal grooves on sides of the block providing legs that have contact surfaces on ends of the legs. When the U-shaped member is forced forward, ends of the legs and the upper and lower wall grip the boring bar from three sides, causing the bar to be forced into position parallel to a centering line. A wide size range of boring bars can be held by this device with minimal adjustment, and change-out of bars is readily carried out when needed.

2 Claims, 2 Drawing Sheets

BORING BAR HOLDER WITH U-SHAPED CLAMPING MEMBER

FIELD OF THE INVENTION

This invention relates generally to tool-holding attachments for machining equipment and more particularly to a device for holding boring bars in place on lathes or other milling machines or boring mills.

BACKGROUND OF THE INVENTION

In operation of lathes for precision drilling of bores, a boring bar with a cutting edge mounted on an end of the bar is normally used. The boring bar, generally in the form of an elongated cylinder, is rigidly held in required position for a specific job by means of a clamping device. Desired features of a device for clamping of boring bars include a high degree of rigidity and sufficient strength to resist severe vibration forces generated in rotation of the equipment and a capability for being readily changed out as may be needed to accomplish different size cuts and to ensure that the stiffest bar possible would always be in use.

Prior art holders for boring bars have exhibited various disadvantages and limitations. Some of these holders have a complex structure and require adjustment by means such as by several set screws to obtain accurate centering. Resistance to adverse effects of vibration has also been a problem.

Prior boring bar assemblies are exemplified by U.S. Pat. No. 3,955,897, issued on May 11, 1976, to Roman et al; U.S. Pat. No. 4,619,564, issued on Oct. 28, 1986, to Jacobson, and U.S. Pat. No. 4,955,767, issued on Sep. 11, 1989, to Kaiser. The Kaiser patent shows a clamping mechanism in which a pair of two-part clamping screws have V-shaped ends that abut against a bar holder, providing, in combination with a support edge, a three-point clamping effect. However, the abutting ends of the screws are close to one another so that only a weak clamping effect is obtained.

SUMMARY OF THE INVENTION

The present invention is directed to a boring bar holder comprising a unitary metal block having a generally triangular chamber extending transversely through the block adjacent to a forward end thereof. The chamber has a pair of fixed surfaces disposed at an acute angle to one another on either side of a centering line, and these surfaces, in combination with surfaces on a sliding member that is movable inward on a side opposite to the centering line, force the boring bar into a centered alignment and secure it in position. The clamping member may take the form of a U-shaped element with a pair of legs which ride inward in horizontal grooves in sides of the block, the clamping surfaces being located on ends of the legs, coplanar with one another. Movement of the clamp member may be carried out by a bolt entering from outside the base of the clamp and engaging a threaded orifice in the block. Rotation of the bolt forces the clamp legs inward, pushing the bar into alignment. This operation is accomplished by merely turning one bolt.

The block is mounted to the compound of a lathe or other support by means of a single large bolt extending upward from a base plate and through the block. A middle region of the block between grooves for the legs of the U-shaped clamp is massive enough to hold the block rigidly in place without being effected by action of the clamp and in a manner such as to avoid movements resulting from vibration.

Spreading of the legs of the U-shaped member due to vibration or other forces may be controlled by providing longitudinal grooves in the bottom of the legs that receive bolts supported in the block.

Boring bar holders embodying the invention will accommodate a wide range of bar sizes, for example, from one-quarter inch to two inches in diameter for a specific holder.

It is therefore an object of this invention to provide a boring bar holder that is self-centering and readily adjusted in use.

Another object is to provide a boring bar holder resistant to effects of machine vibration.

Other objects and advantages of the invention will be apparent from the following detailed description and claims appended hereto.

DESCRIPTION OF THE PREFERRED EMBODIMENT

Figures 1, 3:
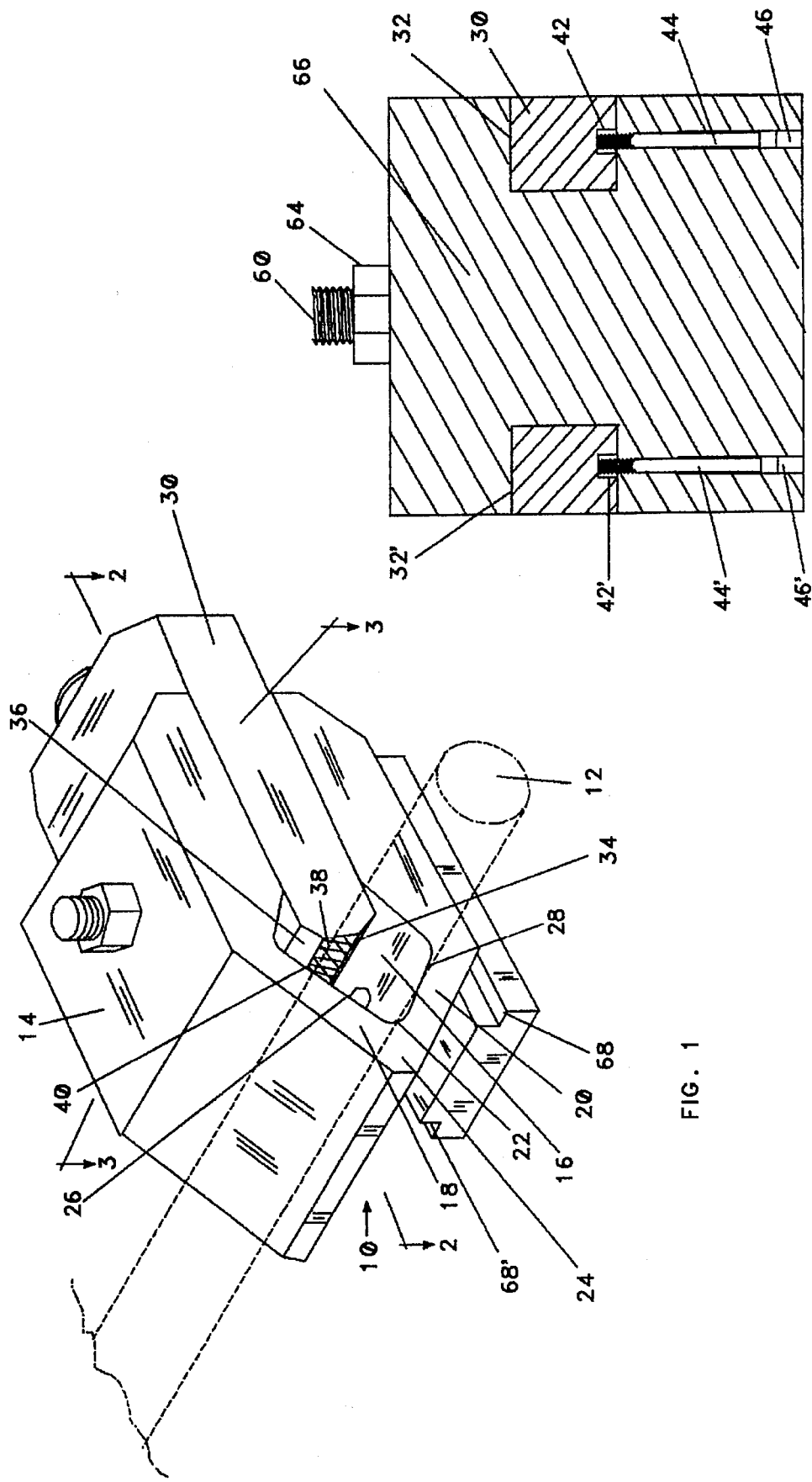
FIG. 1 is a perspective view showing a boring bar in dotted lines secured in place by a holder embodying the invention.
FIG. 3 is a transverse sectional view taken along line 3—3 of FIG. 1.

Referring to FIG. 1 of the drawings, there is shown a holder 10 securing a boring bar 12 in a transversely extending position. The holder has a unitary body 14 made up of a block of material such as carbon steel, giving the holder high strength and rigidity, enabling it to withstand vibration and stresses. A generally triangular transverse cavity 16 extends across the block near the forward end thereof, forming a chamber into which the boring bar is insertable.

Three contacting surfaces are defined in the cavity for applying contact pressure against the bar from three sides so as to provide automatic centering of the bar and to give a high degree of stability. Two of the contacting areas are located on the insides of upper wall 18 and lower wall 20 which define the forward end of the cavity. A centering line 22 is defined along the intersection 24 of these walls at their forward ends. Contact surfaces 26 along the inside of wall 18 and contact surface 28 along the inside of wall 20 are symmetrical with one another and are precisely finished to enable the bar to be accurate centered parallel to the line 22 when forced forward by the third contacting surface.

Contacting surfaces 26 and 28 are disposed at an acute angle with respect to one another so that the surfaces are widely separated for effective clamping. Angles from 68° to 76° may be employed, and 72° is preferred for best results.

Figure 2:
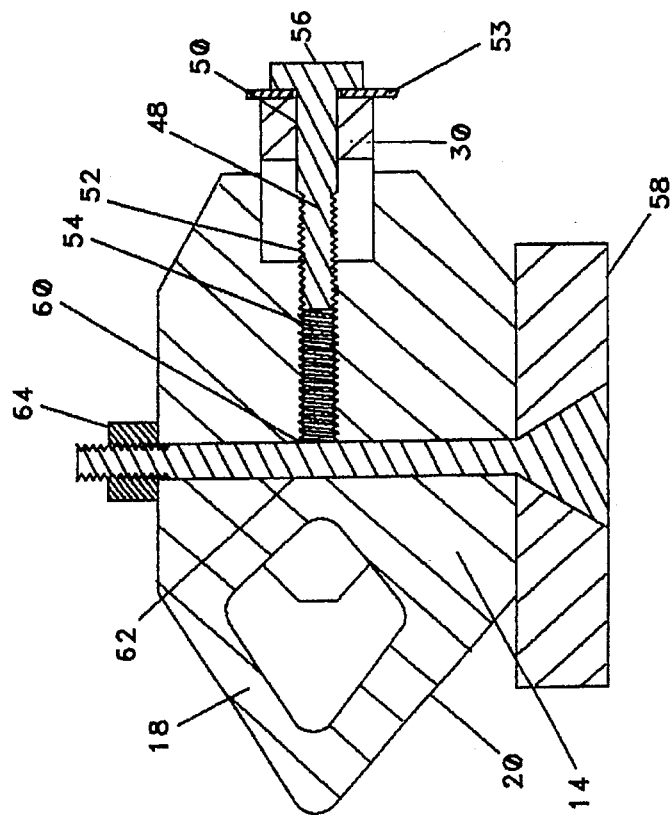
FIG. 2 is a longitudinal sectional view taken along line 2—2 of FIG. 1.

Clamping force is provided by a U-shaped slide clamp 30 which rides in grooves 32, 32' in opposite sides of block 14. Ends 34, 34' of the feet of the U-shaped clamp have corner portions removed to provide surfaces 36, 36' parallel to surfaces 26, 28 which allow clearance of the clamp legs when being moved toward the center line without contact of a sharp corner against walls 18, 20. Forward surfaces 38, 38' of the feet come into contact with the boring bar when slid forward, causing the bar to be centered parallel to centering line 22. A pattern of criss-cross grooves 40 may be provided on surfaces 38, 38' to obtain enhanced clamping action. Each of the legs of the sliding clamp has an elongated groove 42, 42' along the bottom side thereof, which receives an end of upward projecting bolt 44, 44', restraining the legs from spreading outward upon being subjected to vibration forces. The bolts are inserted upward through holes 46, 46' extending straight upward from the bottom of the block. As shown in FIG. 2, the U-shaped clamp 30 is movable forward by tightening of threaded bolt 48 which extends through aperture 50 in the back side of the clamp. Threads 52 of bolt 48 engage a mating threaded aperture 54 in the block, causing the U-shaped clamp to slide forward. One or more washers 53 may be located between the head 56 of the bolt and the clamp to obtain improved contact with the clamp.

The block 14 is securely mounted on a base plate 58 by means of a tapered-head bolt 60 countersunk into the plate and further secured by welding. The bolt extends upward through an aperture 62 in the block. The bolt is also connected by a threaded nut 64, which is brought into contact with the top of the block. In order to ensure against breakage under the high stresses involved, the bolt should have a high hardness value such as Rockwell 58, or grade 8. As shown in FIG. 3, a large central area 66 of the block 14 remains intact so that mounting of the block by tightening of the nut 64 on bolt 60 brings the block into secure position without effecting U-shaped clamp 30, which is independently mounted from the side by bolt 48 and from the bottom by bolts 44, 44'. Tightening of nut 64 does not prevent U-shaped clamp 30 from being slid back and forth as required. Plate 58 on which the block is mounted is in turn secured by means not shown to the compound of a lathe or other equipment as required for a specific application. Upper corner recesses 68, 68' may be provided to facilitate grasping of the plate as required for clamping it.

Figure 4:
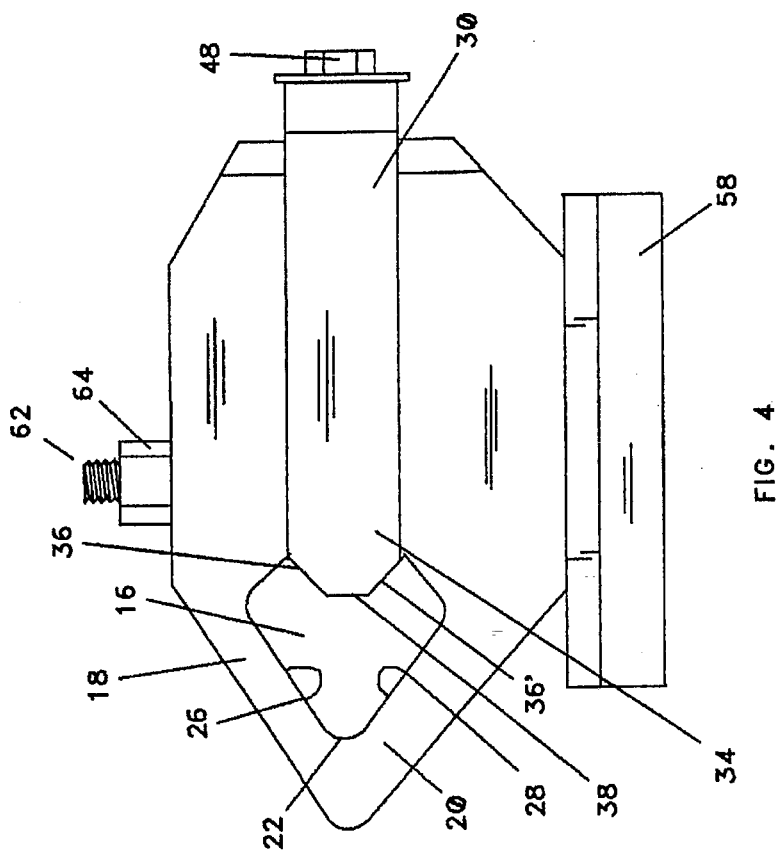
FIG. 4 is an elevational side view of the boring bar holder.

As shown in FIGS. 1 and 4, movement of the U-shaped clamp 30 inward in cavity 16 causes the boring bar 12 to be brought into contact with surfaces in three planes, inner surface 26 of upper wall 18, inner surface 28 of lower wall 20, and coplanar outer surface 38, 38' at the outer end of feet 34, 34'. The bar is forced into parallel alignment with the centering line 22, which is further defined by the farthest points from surface 38, 38' along the intersection of walls 18, 20.

Although the invention is illustrated for use in clamping a cylindrical boring bar, it is also effective for bars having a hexagonal or other polygonal cross-sectional shape. In addition, the invention is described in terms of being mounted with the cavity located horizontally. Other orientations of the clamping device may be used as required for specific operations.

It is also to be understood that the embodiment described above is merely illustrative and is not to be understood as limiting the scope of the invention, which is limited only as indicated by the appended claims.

I claim:

1. Apparatus for holding an elongated boring bar having a generally cylindrical shape comprising:

a unitary metal block having a forward end and a rearward end;

said block having defined therein near said front end a generally triangular cavity extending transversely therethrough;

said cavity at a forward end thereof defined by a first diagonally extending inner surface of an upper wall and a second diagonally extending inner surface of a lower wall, said walls further defining a center line adjacent to an intersection thereof and equidistant to said surfaces;

a U-shaped clamping member comprising a pair of legs, each said leg having an outer end provided with a clamping surface coplanar to a clamping surface of the other of said legs, said clamping member aligned opposite to said centering line and arranged to be moved forward toward said line;

said legs of said clamping member being slidably mounted in longitudinal grooves in side surfaces of said block;

said U-shaped clamping member having a base portion and including a bolt extending through said base portion and said bolt engaging threads of an internal aperture in said block; and a longitudinal groove defined in a bottom surface of each of said legs and a pair of bolts mounted in said block, each said bolt arranged to ride in a said groove of a said leg and thereby secure the legs against spreading outwardly.

2. Apparatus as defined in claim 1 wherein said clamping surfaces of said legs have a pattern of grooves defined therein.

* * * * *